United States Patent [19]

Boyd et al.

[11] 4,313,874
[45] Feb. 2, 1982

[54] DISPERSE MONOAZO DYESTUFFS

[75] Inventors: Violet Boyd; Brian R. Fishwick, both of Manchester, England; Brian Glover, Charlotte, N.C.

[73] Assignee: Imperial Chemical Industries Limited, London, England

[21] Appl. No.: 784,330

[22] Filed: Apr. 4, 1977

Related U.S. Application Data

[63] Continuation of Ser. No. 666,248, Mar. 12, 1976, abandoned.

[30] Foreign Application Priority Data

Mar. 25, 1975 [GB] United Kingdom ............... 12417/75

[51] Int. Cl.$^3$ ................ C07C 107/06; C09B 29/085; C09B 29/26
[52] U.S. Cl. ........................................ 260/207; 8/137; 8/693; 260/207.1
[58] Field of Search ............................ 260/207, 207.1

[56] References Cited

U.S. PATENT DOCUMENTS

| | | | |
|---|---|---|---|
| 3,268,507 | 8/1966 | Kruckenberg | 260/207 |
| 3,335,126 | 8/1967 | Baron et al. | 260/207.1 |
| 3,637,651 | 1/1972 | Baron et al. | 260/207.1 X |

FOREIGN PATENT DOCUMENTS

| | | | |
|---|---|---|---|
| 45-37153 | 11/1970 | Japan | 260/207.1 |
| 1114603 | 5/1968 | United Kingdom | 260/207.1 |
| 1380845 | 1/1975 | United Kingdom | 260/153 |

Primary Examiner—Charles F. Warren
Attorney, Agent, or Firm—Cushman, Darby & Cushman

[57] ABSTRACT

Disperse monoazo dyestuffs of the formula:

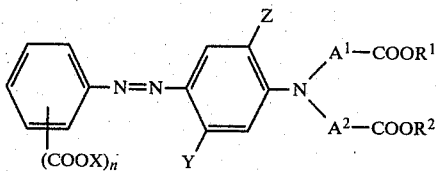

wherein X is lower alkyl, n is 1, 2 or 3, Z is hydrogen, lower alkyl or lower alkoxy, Y is hydrogen, lower alkyl, lower alkoxy, chlorine, bromine, —NHCOX$^1$ or —NHSO$_2$X$^2$, X$^1$ is lower alkyl, lower alkoxy, amino or N-lower alkylamino, X$^2$ is lower alkyl, A$^1$ and A$^2$ are each independently lower alkylene, and R$^2$ and R$^3$ are each independently lower alkyl or hydroxyalkyl containing from 2 to 4 carbon atoms, together with a process of manufacture and the use of such dyestuffs for the coloration of synthetic polymeric materials particularly polyesters.

3 Claims, No Drawings

DISPERSE MONOAZO DYESTUFFS

This is a continuation of application Ser. No. 666,248 filed Mar. 12, 1976, now abandoned.

This invention relates to disperse monoazo dyestuffs which are valuable for colouring synthetic textile materials, particularly aromatic polyester textile materials.

According to the invention there are provided the disperse monoazo dyestuffs of the formula:

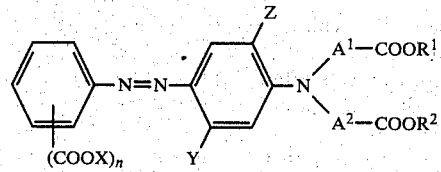

wherein X is lower alkyl, n is 1, 2 or 3, Z is hydrogen, lower alkyl or lower alkoxy, Y is hydrogen, lower alkyl, lower alkoxy, chlorine, bromine, —NHCOX¹ or —NHSO₂X², X¹ is lower alkyl, lower alkoxy, amino or N-lower alkylamino, X² is lower alkyl, A¹ and A² are each independently lower alkylene, and R² and R³ are each independently lower alkyl or hydroxyalkyl containing from 2 to 4 carbon atoms.

Throughout this specification the terms "lower alkyl", "lower alkoxy" and "lower alkylamino" are used to denote alkyl, alkoxy and alkylamino radicals respectively containing from 1 to 4 carbon atoms, whilst "lower alkylene" denotes alkylene radicals containing from 1 to 6 carbon atoms.

As examples of loweralkyl represented by X, Z, Y, X¹, X², R¹ and R² there may be mentioned methyl, ethyl, n-propyl, isopropyl and n-butyl. As examples of lower alkoxy represented by X¹, Z and Y there may be mentioned ethoxy and preferably methoxy. As examples of lower alkylene represented by A¹ and A² there may be mentioned methylene, trimethylene, propylene, tetramethylene, hexamethylene and, above all, ethylene. As examples of hydroxyalkyl represented by R¹ and R² there may be mentioned β-hydroxyethyl, β- or γ-hydroxypropyl and β-, γ- or δ-hydroxybutyl. As examples of N-lower alkylamino represented by X¹ there may be mentioned methylamino and ethylamino.

A preferred class of the dyestuffs of the invention comprises the dyestuffs of the formula:

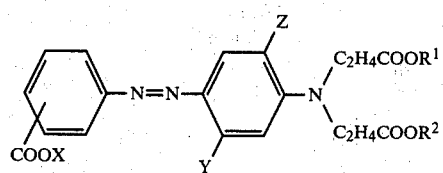

wherein X, Y, Z, R¹ and R² have the meanings stated. Preferably Y is hydrogen or lower alkylcarbonylamino.

According to a further feature of the invention there is provided a process for the manufacture of the said dyestuffs which comprises diazotising an amine of the formula:

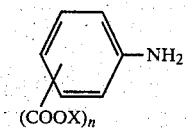

and coupling with a coupling component of the formula:

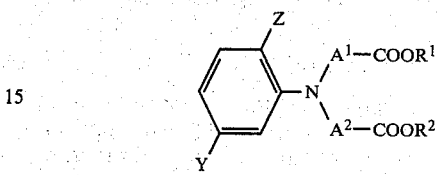

wherein X, n, Z, Y, A¹, A², R¹ and R² have the meanings stated.

The process of the invention can be conveniently carried out by, for example, adding sodium nitrite to a solution or suspension of the amine in an aqueous solution of a strong inorganic acid, or by adding the amine to a solution of nitrosylsulphuric acid. Sulphamic acid can then be added, if desired, to destroy any residual nitrous acid, and the resulting solution or suspension of the diazo compound is then added to a solution of the coupling component in water containing an acid and/or a water-soluble organic liquid such as acetone. The pH of the resulting mixture is then, if desired, adjusted so as to facilitate coupling, and when this is complete the resulting dyestuff is isolated in conventional manner.

As examples of the said amines there may be mentioned the methyl, ethyl, n-propyl or n-butyl ester of 2-, 3- or 4-aminobenzoic acid, 4- or 3-aminophthalic acid, 2-aminoterephthalic acid and aniline 2:4:6-tricarboxylic acid and 2-, 4- or 5-aminoisophthalic acid.

As examples of the said coupling components there may be mentioned N:N-di(β-methoxycarbonylethyl)-aniline, -m-toluidine, -m-chloroaniline, -m-acetylaminoaniline or -2:5-dimethoxyaniline, and N:N-di[β-(β'-hydroxyethoxycarbonyl)ethyl]-aniline, -m-toluidine, -m-chloroaniline, -m-acetylaminoaniline, -o-toluidine, -2-methoxy-5-acetylaminoaniline or -2:5-dimethoxyaniline.

The azo dyestuffs of the invention when dispersed in aqueous medium are valuable for colouring synthetic textile materials for example cellulose acetate, nylon and especially aromatic polyester textile materials. The said colorations can be obtained by dyeing, padding or printing processes using the conditions and other additives which are conventional in colouring such textile materials. At the conclusion of the said processes the coloured textile materials are rinsed in water and then preferably given a clearing treatment in order to remove loose dyestuff from the surface of the textile material. Whilst this clearing treatment can comprise immersion in a warm aqueous alkaline solution of sodium hydrosulphite it is found that the presence of the sodium hydrosulphite is not essential and treatment for a few minutes in an aqueous alkaline solution of pH between 10 and 13.5 and at a temperature of between 50° and 85° C. (for example in an aqueous solution of sodium carbonate or sodium hydroxide) completely removes loose dyestuff.

When so applied the azo dyestuffs of the invention yield yellow to red shades having excellent fastness to the tests conventionally applied to synthetic textile materials.

The azo dyestuffs of the invention can also be used for the mass-coloration of aromatic polyesters, or can be used to color synthetic textile materials by the transfer printing process optionally under vacuum or under wet or humid conditions.

The invention is illustrated but not limited by the following Examples in which the parts and percentages are by weight.

EXAMPLE 1

A solution of 3.02 parts of methyl p-aminobenzoate in 40 parts of acetic acid is cooled to 10° C., and 4 parts of a concentrated aqueous solution of hydrochloric acid are added followed by 11 parts of a 14% aqueous solution of sodium nitrite. The mixture is stirred for 1 hour at 10° C. and the resulting solution of the diazo compound is then added to a solution of 6.4 parts of N:N-di($\beta$-methoxycarbonylethyl)-m-aminoacetanilide in a mixture of 60 parts of acetone and 120 parts of a 1% aqueous solution of hydrochloric acid at 5° C. Sodium acetate is added until the pH is 5, the mixture is stirred for 30 minutes at 5° C., and the precipitated dyestuff is filtered off, washed with water and dried.

The dyestuff is converted into an aqueous dispersion and this is incorporated into a print paste which is then applied onto a polyethylene terephthalate textile material in conventional manner. A bright orange print is obtained which has excellent fastness to light, to wet treatments and to dry heat treatments.

The following Table gives further Examples of the dyestuffs of the invention of the formula:

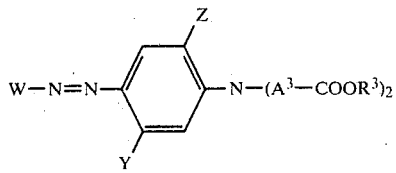

the symbols of which have the values given in the respective columns of the Table, and the shades obtained when the said dyestuffs are applied to an aromatic polyester textile material being given in the last column of the Table.

The dyestuffs of these Examples were obtained by diazotising the appropriate amine of the formula: W-NH$_2$ and coupling with the appropriate coupling component of the formula:

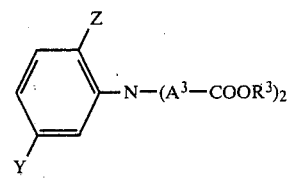

using methods similar to that described in Example 1.

| Example | W | Y | Z | A$^3$ | R$^3$ | Shade |
|---|---|---|---|---|---|---|
| 2 | m-methoxycarbonylphenyl | acetylamino | hydrogen | ethylene | methyl | Reddish-yellow |
| 3 | o-methoxycarbonylphenyl | " | " | " | " | Golden-yellow |
| 4 | p-ethoxycarbonylphenyl | " | " | " | " | Orange |
| 5 | p-n-propoxycarbonylphenyl | " | " | " | " | " |
| 6 | p-iso-propoxycarbonylphenyl | " | " | " | " | " |
| 7 | p-n-butoxycarbonylphenyl | " | " | " | " | " |
| 8 | p-($\beta$-methyl-n-propoxycarbonyl)phenyl | " | " | " | " | " |
| 9 | p-($\alpha$-methyl-n-propoxycarbonyl)phenyl | " | " | " | " | " |
| 10 | o-ethoxycarbonylphenyl | " | " | " | " | Golden-yellow |
| 11 | 2:4-di(methoxycarbonyl)phenyl | " | " | " | " | " |
| 12 | 2:5-di(methoxycarbonyl)phenyl | " | " | " | " | Yellowish-orange |
| 13 | 2:6-di(methoxycarbonyl)phenyl | " | " | " | " | Orange |
| 14 | 2:3-di(methoxycarbonyl)phenyl | " | " | " | " | Yellowish-orange |
| 15 | 3:4-di(methoxycarbonyl)phenyl | " | " | " | " | Orange |
| 16 | 3:5-di(methoxycarbonyl)phenyl | " | " | " | " | Golden-yellow |
| 17 | p-methoxycarbonylphenyl | " | " | " | ethyl | Orange |
| 18 | " | " | " | " | n-propyl | " |
| 19 | " | " | " | " | iso-propyl | " |
| 20 | " | " | " | " | n-butyl | " |
| 21 | " | " | " | " | $\beta$-methyl-n-propyl | " |
| 22 | " | " | " | " | $\alpha$-methyl-N-propyl | " |
| 23 | " | " | " | trimethylene | methyl | Reddish-orange |
| 24 | " | " | " | methylene | " | Reddish-yellow |
| 25 | " | " | " | " | ethyl | " |
| 26 | " | " | " | tetramethylene | methyl | Reddish-orange |
| 27 | " | " | " | $\beta$-methyl-ethylene | " | Orange |
| 28 | " | propionylamino | " | ethylene | " | " |
| 29 | " | n-propyl-carbonylamino | " | " | " | " |
| 30 | " | isopropyl carbonyl amino | " | " | " | " |
| 31 | " | methoxycarbonyl- | " | " | " | " |

-continued

| Example | W | Y | Z | A³ | R³ | Shade |
|---|---|---|---|---|---|---|
| 32 | " | ethoxycarbonyl-amino | " | " | " | " |
| 33 | " | ureido | " | " | " | " |
| 34 | " | " | " | " | ethyl | " |
| 35 | " | N-methylureido | " | " | methyl | " |
| 36 | " | N-ethylureido | " | " | " | " |
| 37 | " | methylsulphonyl-amino | " | " | " | " |
| 38 | " | methylsulphonyl-amino | " | " | ethyl | " |
| 39 | " | ethylsulphonyl-amino | " | " | methyl | " |
| 40 | " | acetylamino | " | " | β-hydroxy-ethyl | " |
| 41 | " | " | " | " | γ-hydroxy-propyl | " |
| 42 | " | " | " | " | δ-hydroxy-butyl | " |
| 43 | " | " | " | " | β-hydroxy-propyl | " |
| 44 | " | " | " | " | α-methyl-β-hydroxy-propyl | " |
| 45 | p-ethoxycarbonylphenyl | " | " | " | β-hydroxy-ethyl | " |
| 46 | o-methoxycarbonylphenyl | " | " | " | β-hydroxy-ethyl | Golden-yellow |
| 47 | m-methoxycarbonylphenyl | " | " | " | β-hydroxy-ethyl | Reddish-yellow |
| 48 | 2:4-di(methoxycarbonyl)phenyl | " | " | " | β-hydroxy-ethyl | " |
| 49 | 2:5-di(methoxycarbonyl)phenyl | " | " | " | β-hydroxy-ethyl | Orange |
| 50 | 3:4-di(methoxycarbonyl)phenyl | " | " | " | β-hydroxy-ethyl | " |
| 51 | 3:5-di(methoxycarbonyl)phenyl | " | " | " | β-hydroxy-ethyl | Golden-yellow |
| 52 | p-methoxycarbonylphenyl | propionylamino | " | " | β-hydroxy-ethyl | Orange |
| 53 | " | ethoxycarbonyl-amino | " | " | β-hydroxy-ethyl | " |
| 54 | " | acetylamino | methoxy | " | methyl | Scarlet |
| 55 | " | " | ethoxy | " | " | " |
| 56 | " | " | methyl | " | " | Orange |
| 57 | " | propionylamino | methoxy | " | ethyl | Scarlet |
| 58 | " | acetylamino | " | " | β-hydroxy-ethyl | " |
| 59 | 2:4-di(methoxycarbonyl)phenyl | " | " | " | methyl | " |
| 60 | p-methoxycarbonylphenyl | hydrogen | hydrogen | " | " | Yellow |
| 61 | p-ethoxycarbonylphenyl | " | " | " | " | " |
| 62 | m-methoxycarbonylphenyl | " | " | " | " | Greenish-yellow |
| 63 | o-methoxycarbonylphenyl | " | " | " | " | " |
| 64 | 2:5-di(methoxycarbonyl)phenyl | " | " | " | " | Yellow |
| 65 | p-methoxycarbonylphenyl | " | " | " | ethyl | " |
| 66 | " | " | " | " | β-hydroxy-ethylmethyl | " |
| 67 | " | " | " | methylene | methyl | Greenish-yellow |
| 68 | " | " | " | tetra-methylene | " | Yellow |
| 69 | " | methyl | " | ethylene | " | Reddish-yellow |
| 70 | " | " | " | methylene | ethyl | Yellow |
| 71 | " | " | " | trimethylene | methyl | Reddish-yellow |
| 72 | p-ethoxycarbonylphenyl | " | " | ethylene | " | " |
| 73 | o-methoxycarbonylphenyl | " | " | " | " | Yellow |
| 74 | 3:4-di(methoxycarbonyl)phenyl | " | " | " | " | Golden-yellow |
| 75 | p-methoxycarbonylphenyl | methoxy | " | " | " | " |
| 76 | " | hydrogen | methoxy | " | " | Orange |
| 77 | " | methyl | " | " | " | " |
| 78 | 2:4-di(methoxycarbonyl)phenyl | " | " | " | " | Reddish-orange |
| 79 | p-methoxycarbonylphenyl | bromine | hydrogen | " | " | Greenish-yellow |
| 80 | " | chlorine | " | " | " | " |
| 81 | m-methoxycarbonylphenyl | " | " | " | " | " |
| 82 | 2:5-di(methoxycarbonyl)phenyl | " | " | " | " | " |

-continued

| Example | W | Y | Z | A³ | R³ | Shade |
|---|---|---|---|---|---|---|
| 83 | p-ethoxycarbonylphenyl | '' | '' | '' | '' | '' |

We claim:
1. A disperse monazo dyestuff of the formula:

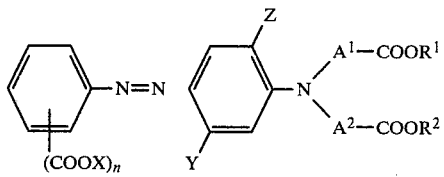

wherein X is lower alkyl, n is 1, 2 or 3, Z is hydrogen, lower alkyl or lower alkoxy, Y is lower alkylcarbonylamino, $A^1$ and $A^2$ are each independently lower alkylene, and $R^1$ and $R^2$ are each independently lower alkyl or hydroxyalkyl containing from 2 to 4 carbon atoms.

2. A disperse monoazo dyestuff as claimed in claim 1 wherein $A^1$ and $A^2$ are ethylene groups.

3. A disperse monoazo dyestuff as claimed in claim 2 of the formula:

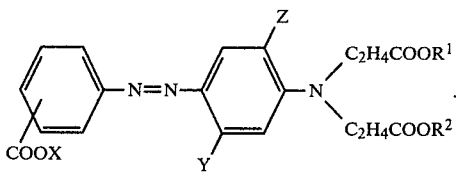

* * * * *